Figure 1:
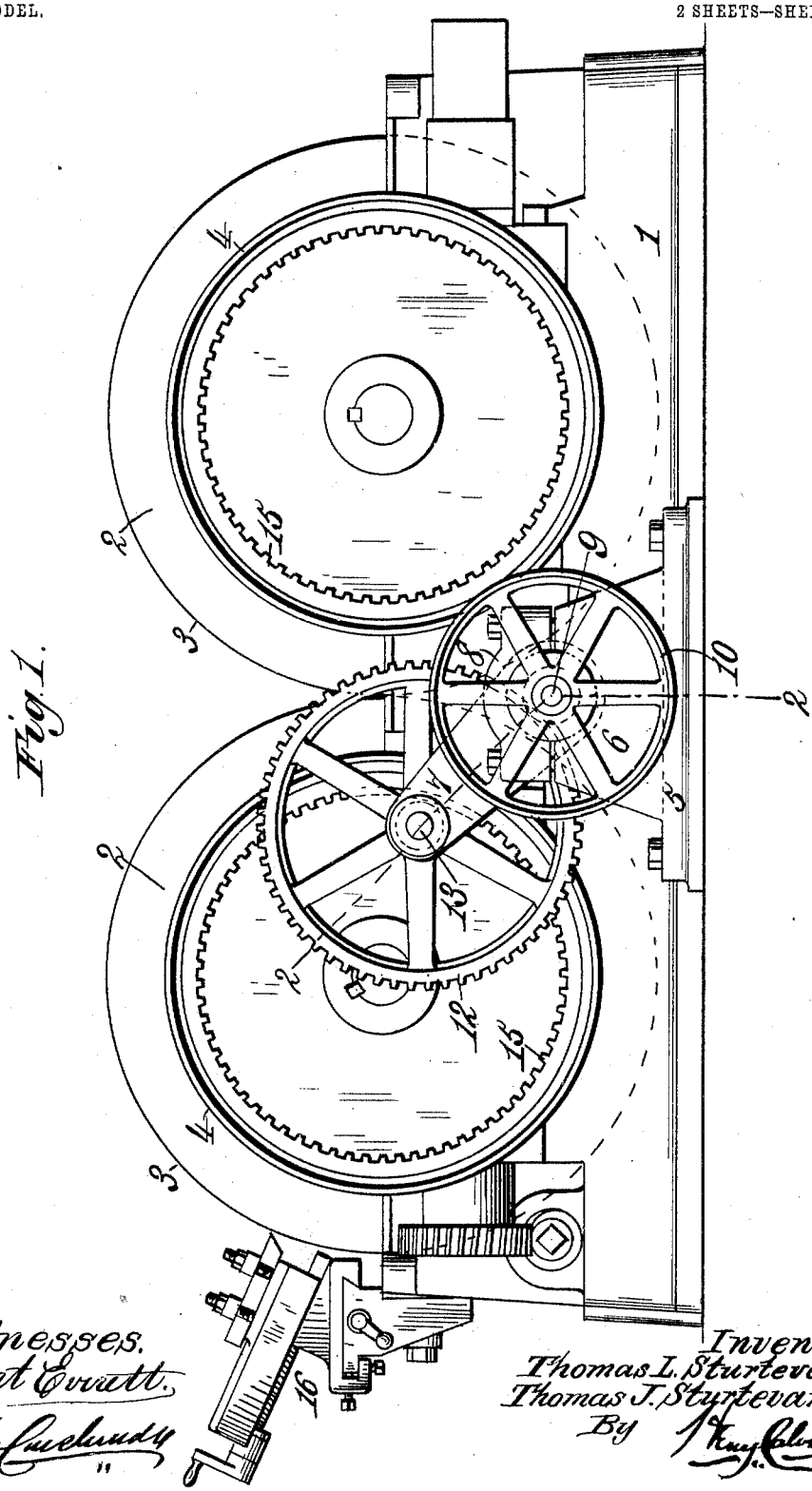

No. 759,644. PATENTED MAY 10, 1904.
T. L. & T. J. STURTEVANT.
TURNING APPARATUS FOR ROLL TIRES.
APPLICATION FILED AUG. 18, 1903.
NO MODEL. 2 SHEETS—SHEET 1.

Witnesses.
Robert Everett.
Jo Cuchundy

Inventors
Thomas L. Sturtevant.
Thomas J. Sturtevant.
By
Atty

No. 759,644. PATENTED MAY 10, 1904.
T. L. & T. J. STURTEVANT.
TURNING APPARATUS FOR ROLL TIRES.
APPLICATION FILED AUG. 18, 1903.
NO MODEL. 2 SHEETS—SHEET 2.

Witnesses.
Robert Everett,

Inventors
Thomas L. Sturtevant.
Thomas J. Sturtevant.
By S. Henry Calver
Att'y.

No. 759,644. Patented May 10, 1904.

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, AND BOSTON, MASSACHUSETTS, A CORPORATION OF MAINE.

TURNING APPARATUS FOR ROLL-TIRES.

SPECIFICATION forming part of Letters Patent No. 759,644, dated May 10, 1904.

Application filed August 18, 1903. Serial No. 169,904. (No model.)

*To all whom it may concern:*

Be it known that we, THOMAS LEGGETT STURTEVANT, residing at Quincy, and THOMAS JOSEPH STURTEVANT, residing at Wellesley, in the county of Norfolk and State of Massachusetts, citizens of the United States, have invented certain new and useful Improvements in Turning Apparatus for Roll-Tires, of which the following is a specification, reference being had therein to the accompanying drawings.

The present invention relates to apparatus for turning or machining the faces of rolls or tires of crushing-machines, and has for its object to provide turning devices and roll-driving mechanism by means of which the rolls or tires may be turned and trued without removing them from their normal positions in the machine, for the removal of crushing or other heavy rolls from the machine in which they are used is attended with difficulty and consumes a great deal of time on account of the size and weight of the rolls and the necessity of dismantling the machine in order to effect their removal and again assembling it after truing the faces of the rolls.

In the embodiment of the invention which will be shown in the drawings and described in detail hereinafter we have shown it applied to the well-known Sturtevant centrifugal roll-crusher, shown and described in our United States Patent No. 670,534, granted January 7, 1902, but it will be understood that the turning attachment may be used in connection with any machine in which it is desired to turn or true roll or tire surfaces.

In the drawings herewith we have illustrated only so much of the crushing-machine as is necessary for a complete understanding of our invention.

Figure 2:
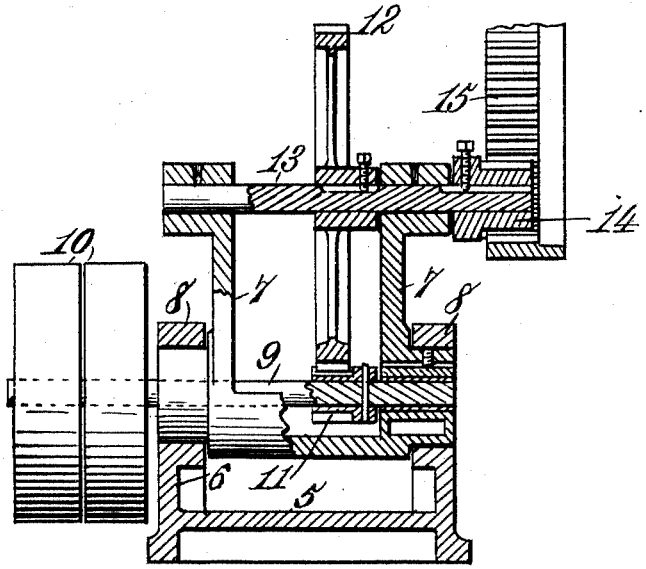
Figure 3:
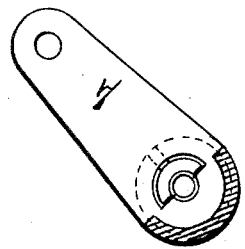

In said drawings, Figure 1 is a view in side elevation of a centrifugal roll-crusher with the turning attachment in position for truing the tire-face of one of the rolls. Fig. 2 is a sectional view on line 2 2 of Fig. 1. Fig. 3 is a detail view of the swinging arm which supports the roll-driving counter-shaft.

Referring to the drawings by numerals, like numbers indicating like parts in the several views, 1 indicates the roll-bed of the machine, and 2 the crushing-rolls, mounted in suitable bearings on said bed, said crushing-rolls having roll-tires 3 and roll-driving pulleys 4, as shown in Fig. 1. Bolted to the floor adjacent the roll-bed 1 is a bed-plate 5, which, as shown in the drawings, is preferably located midway of the crushing-rolls for a purpose which will presently appear. Mounted in suitable standards or bearing-blocks 6, carried by the bed-plate 5, is a swinging arm or frame 7, said arm or frame being held in any position of angular adjustment by means of cap-plates 8, bolted to the tops of the bed-plate bearing-blocks 6, as shown in Figs. 1 and 2. The said swinging arm or frame receives and forms a bearing for a power-shaft 9, which shaft is provided at its outer end with an ordinary fast and loose pulley 10, by means of which it may be belted to a factory-shaft or source of power. Mounted on the said shaft 9 is a pinion 11, which meshes with and drives a gear-wheel 12, keyed to a counter-shaft 13, mounted in suitable bearings at the outer end of the swinging frame 7 and movable with said frame. The said counter-shaft 13 is so mounted in the frame 7 as to be readily loosened in its bearings and moved therein longitudinally and carries at its inner end a pinion 14, which is removably secured thereto by a set-screw (see Fig. 2) and when the parts are in working position meshes with an internal gear 15 on the rim of the driving-pulley 4, as clearly shown in Fig. 2.

With the parts as above described it is clear that when the parts are in the working position shown in Fig. 1 and power is applied to the shaft 9 through the pulley 10 the driving-pulley 4 and the roll 2 will be rotated through the pinion 11, gear-wheel 12, pinion 14, and internal gear 15, and the proper turning speed will be given to the roll by the reducing-gearing described. By mounting the attachment midway of the rolls, as shown, it is apparent that it is well adapted for use in facing opposed twin rolls of the type shown, for by simply swinging the frame 7 from the position shown in Fig. 1 to the opposite angular position the opposing roll may be driven so that complicated adjustments of the attachment to true twin rolls are entirely done away with.

Secured to the frame of the crushing-machine in proper position relative to the face of the roll or the roll-tire is any suitable turning device 16, comprising the ordinary slide-rest, tool-holder, and turning-tool, means being provided for giving the proper longitudinal and transverse feed movements to the tool, so that both the uneven or worn face and the sides of the roll-tire, which latter are apt to become spread or upset in use, may be turned or machined to true them.

When it is desired to shift the roll-driving mechanism and bring it into proper position for rotating the opposing crushing-roll of the machine, the pinion 14 on the counter-shaft 13 will be removed and the counter-shaft loosened in its bearings to permit its longitudinal movement, so that it will clear the rim of the driving-pulley 4. The cap-plates 8 will be loosened to release the swinging frame 7, and the said frame 7 will then be thrown through an angle of ninety degrees to bring it into proper driving relation to the opposing roll, where it will be clamped in position and the driving parts again assembled, with the pinion 14 in mesh with the internal gear of the opposite roll. The turning device 16 will of course be shifted to the opposite end of the machine and in position for turning the roll, and the shaft 9 may be driven in the opposite direction by crossing the power-belt which drives the pulley 10.

From the foregoing it will be apparent that we have provided a simple and effective turning attachment which is capable of performing its work efficiently with the rolls in place in the machine and doing away with the necessity and annoyance of having to remove them from the machine in which they are used to be faced, thus effecting a saving in time and labor incident to dismantling and assembling for the purpose of truing the heavy rolls which are used in crushing-machines of the type shown and described and in analogous machines.

While we have shown and described a particular construction of our invention, and that the best known to us, it will be understood that the same may be varied to a considerable extent without departing from the spirit of our invention, and we do not, therefore, limit ourselves to any of the details shown and described, except in so far as we are restricted by the terms of the appended claims. It will be understood also that while we have shown the turning attachment in connection with a particular type of machine it may be used with any other machine where it is desirable or advantageous to true or machine a roll or tire face without removing the same from the machine.

We claim as our invention—

1. In a turning or machining attachment for crushing-rolls, the combination with a turning-tool device and a driving-shaft, of a swinging arm or frame, a counter-shaft carried by said swinging arm or frame, driving connections between said power-shaft and said counter-shaft, and means on said counter-shaft for driving the crushing-roll to be turned or machined.

2. In a turning or machining attachment for crushing-rolls, the combination with a turning-tool device and a power-shaft, of a swinging arm or frame mounted on an axis coincident with the axis of said power-shaft, a counter-shaft carried at the outer end of said swinging arm or frame, means for driving said counter-shaft from said power-shaft, means carried by said counter-shaft to rotate the crushing-roll, and means for clamping said swinging arm in proper driving relation to the said roll.

3. In a turning or machining attachment for crushing-rolls, the combination with a suitable bed-plate, of a swinging arm or frame angularly adjustable thereon, a power-shaft mounted in the lower end of said swinging arm or frame with its axis coincident with the axis of said swinging arm or frame, a counter-shaft mounted in the outer end of said swinging arm or frame, means for driving said counter-shaft from said power-shaft, a turning-tool device, and means, carried by said counter-shaft, for driving the crushing-roll.

4. In a turning or machining attachment for crushing-rolls, the combination with a turning-tool device and a power-shaft, of a swinging arm or frame mounted on an axis coincident with the axis of said power-shaft, a counter-shaft mounted in the free end of said swinging arm or frame, a driving-pinion on said power-shaft, a counter-gear on said counter-shaft, and a driving-pinion on said counter-shaft adapted to mesh with an internal gear on the crushing-roll-driving pulley.

5. In a turning or machining attachment for crushing-rolls, the combination with a turning-tool device and a power-shaft, of a swinging arm or frame, a counter-shaft carried by said swinging arm or frame and longitudinally movable in its bearings, means for driving said counter-shaft from said power-shaft, and a driving-pinion removably secured at the inner end of said counter-shaft and adapted to engage an internal gear on the roll-driving pulley.

6. In a turning attachment for machining twin crushing-rolls, the combination with a turning-tool device and a power-driven shaft, of a swinging arm or frame angularly adjustable to operative relation with respect to either of said rolls, a counter-shaft carried by said swinging arm or frame, means for driving said counter-shaft from said power-shaft, and means, carried by said counter-shaft, for engaging and driving the roll-pulley of either of said crushing-rolls when said swinging arm or frame is adjusted to different angular positions.

7. In a turning or machining attachment for crushing-rolls, the combination with a turning-tool device and a suitable bed-plate having standards, of a swinging arm or frame mounted in said standards, clamping cap-plates for rigidly securing said arm or frame in proper position, a power-shaft mounted in bearings at the axis of said swinging arm or frame, a counter-shaft carried by the outer end of said swinging arm or frame, a pinion on said power-shaft, a counter-gear on said counter-shaft meshing with said pinion and driven thereby, and a roll-driving pinion at the inner end of said counter-shaft adapted to mesh with an internal gear on the rim of the crushing-roll-driving pulley and drive the said roll.

8. In a turning or machining attachment for rolls, the combination with a turning-tool device and a suitable bed-plate having standards, of a swinging arm or frame mounted in said standards, clamping cap-plates for rigidly securing said arm or frame in proper position, a power-shaft mounted in bearings in said swinging arm or frame, a counter-shaft carried at the outer end of said swinging arm and movable longitudinally in its bearings, a pinion on said power-shaft, a counter-gear on said counter-shaft meshing with said pinion and driven thereby, and a roll-driving pinion removably secured to the inner end of said counter-shaft and adapted to mesh with an internal gear on the rim of the crushing-roll-driving pulley and drive the said roll.

9. In a turning attachment for machining, while in place, the surfaces of opposed twin crushing-rolls, the combination with a turning-tool device detachably mounted in turning relation to a crushing-roll surface; of roll-driving pulleys, and an auxiliary driving mechanism adapted to gear with either of two driving-pulleys and shiftable from one roll-driving pulley to the other to drive said pulleys and rotate the rolls at proper turning speeds.

10. In a turning attachment for machining, while in place, the surfaces of crushing-rolls, the combination with a turning-tool device detachably mounted in turning relation to a roll-surface, of a roll-driving pulley having a ring-gear, and an auxiliary driving mechanism, comprising a power-shaft and speed-reducing gears, one of said speed-reducing gears meshing with said ring-gear to drive said roll-driving pulley and rotate the roll at proper turning speed.

11. In a turning attachment for machining, while in place, the surfaces of crushing-rolls, the combination with a turning-tool device detachably mounted in turning relation to a roll-surface, of a roll-driving pulley having an internal ring-gear, and an auxiliary driving mechanism comprising a power-shaft and speed-reducing gearing having a connection with said internal ring-gear to drive said pulley and rotate the roll at proper turning speed.

12. In a turning attachment for machining, while in place, the surfaces of rolls, the combination with a turning-tool device detachably mounted in turning relation to a roll-surface, of an auxiliary driving gearing mechanism adapted to connect with and drive either of two different crushing-rolls and shiftable to and from two different driving positions to rotate a crushing-roll at proper turning speed.

13. In a turning attachment for machining, while in place, the surfaces of crushing-rolls, the combination with a turning-tool device detachably mounted in turning relation to a roll-surface; a roll-driving pulley having a ring-gear, and an auxiliary driving mechanism having a gearing connection with said ring-gear and comprising a power-shaft, a swinging arm or frame, and speed-reducing gears carried by said arm or frame to drive said pulley and rotate the roll at proper turning speed.

14. In a turning attachment for machining, while in place, the surfaces of opposed twin crushing-rolls, the combination with a turning-tool device detachably mounted in turning relation to a roll-surface; roll-driving pulleys having ring-gears, and auxiliary driving mechanism comprising a power-shaft, a swinging arm or frame, and speed-reducing gearing carried by said arm or frame and shiftable to a gearing connection with either of said ring-gears to drive said pulleys and rotate the said rolls at proper turning speeds.

In testimony whereof we affix our signatures in presence of two witnesses.

THOS. LEGGETT STURTEVANT.
THOMAS JOSEPH STURTEVANT.

Witnesses:
L. K. STURTEVANT,
RUBERT M. GAY.